US008613218B2

(12) United States Patent
Ando

(10) Patent No.: US 8,613,218 B2
(45) Date of Patent: Dec. 24, 2013

(54) DIAGNOSIS APPARATUS FOR LEAKAGE MECHANISM IN INTERNAL COMBUSTION ENGINE

(75) Inventor: Daigo Ando, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 295 days.

(21) Appl. No.: 13/254,002

(22) PCT Filed: Oct. 19, 2010

(86) PCT No.: PCT/JP2010/068360

§ 371 (c)(1), (2), (4) Date: Aug. 31, 2011

(87) PCT Pub. No.: WO2012/053055

PCT Pub. Date: Apr. 26, 2012

(65) Prior Publication Data

US 2012/0090391 A1 Apr. 19, 2012

(51) Int. Cl.
*G01M 15/09* (2006.01)

(52) U.S. Cl.
USPC ........................................................ 73/114.43

(58) Field of Classification Search
USPC ................ 73/114.38, 114.42, 114.43, 114.51
See application file for complete search history.

(56) References Cited

U.S. PATENT DOCUMENTS 5,773,716 A * 6/1998 Antonioli et al. .......... 73/114.51
6,367,455 B2 * 4/2002 Hirata et al. .................. 123/497
7,197,918 B2 * 4/2007 Shen .......................... 73/114.51
2002/0112528 A1 * 8/2002 Antonioli et al. .............. 73/49.7
2003/0172720 A1 * 9/2003 Sweetland et al. ............. 73/49.7
2005/0005880 A1 * 1/2005 Bale et al. .................. 123/90.11
2005/0034514 A1 * 2/2005 Shen ........................... 73/119 A
2006/0037586 A1 * 2/2006 Fritsch et al. ................ 123/478
2006/0130560 A1 * 6/2006 Shamine ........................... 73/40
2007/0079808 A1 4/2007 Takahashi
2007/0101972 A1 * 5/2007 Majima ......................... 123/458
2007/0113634 A1 * 5/2007 Kimura ........................ 73/118.1
2009/0240417 A1 9/2009 Fushiki et al.
2009/0250038 A1 * 10/2009 Xu et al. ....................... 123/457

FOREIGN PATENT DOCUMENTS

JP 2007-100624 A 4/2007
JP 2008-019833 A 1/2008
JP 2009-270511 A 11/2009
WO 2007/007558 A1 1/2007

* cited by examiner

*Primary Examiner* — Eric S McCall
(74) *Attorney, Agent, or Firm* — Sughrue Mion, PLLC

(57) ABSTRACT

After an engine stop duration exceeds a predetermined time period (that is, if a decision outcome of S100 is positive), diagnosis of a leakage mechanism, which is a relief valve, for diagnosing the presence/absence of an abnormality is not performed during a current engine stop (S102). Therefore, even if the fuel pressure in the high-pressure fuel system is reduced to a low-pressure level due to temperature decrease as though fuel has been leaked in a state in which high-pressure fuel in a high-pressure fuel system cannot be leaked due to an abnormality in the relief valve, it generally occurs after the predetermined time period since such a decrease to a low-pressure level due to the temperature decrease is slow. Thus, an erroneous diagnosis as being normal is prevented from being made since the diagnosis has been suspended when the fuel pressure becomes equal to the low-pressure level.

8 Claims, 9 Drawing Sheets

DIAGNOSIS APPARATUS FOR LEAKAGE MECHANISM IN INTERNAL COMBUSTION ENGINE

CROSS REFERENCE TO RELATED APPLICATIONS

This application is a National Stage of International Application No. PCT/JP2010/068360, filed on Oct. 19, 2010, the contents of all of which are incorporated herein by reference in their entirety.

FIELD OF THE INVENTION

The present invention relates to a leakage mechanism diagnosis apparatus for diagnosing the presence/absence of an abnormality in a leakage mechanism for a fuel system of an internal combustion engine.

BACKGROUND OF THE INVENTION

The fuel system of an internal combustion engine generally includes a pressure reducing valve that leaks fuel to reduce the fuel pressure in an accumulator for accumulating fuel at high pressure. Apparatuses for diagnosing the presence/absence of an abnormality in the leak function of a pressure reducing valve have been proposed (for example, see Patent Document 1).

In Patent Document 1, a diagnosis is performed of a pressure reducing valve serving as a leakage mechanism and of a fuel pressure sensor for detecting the fuel pressure in the accumulator. Among these, in particular, for the diagnosis of the fuel pressure sensor, the time at which the fuel pressure sensor is diagnosed is set in consideration of the fuel viscosity, which varies in accordance with fuel temperature changes. That is, the time required for the pressure inside of the accumulator to decrease to atmospheric state from a high-pressure state by opening the pressure reducing valve is extended as the fuel viscosity is increased even if the pressure reducing valve is normal. The fuel viscosity increases as fuel temperature is lowered. Therefore, in Patent Document 1, the time from when the pressure reducing valve is opened to when diagnosis is performed is set longer as the fuel temperature is lower to ensure diagnosis accuracy in diagnosing the presence/absence of an abnormality in the fuel pressure sensor.

PRIOR ART DOCUMENTS

Patent Documents

Patent Document 1: Japanese raid-Open Patent Publication No. 2007-100624 (pages 7 to 8, FIGS. 3 to 5)

SUMMARY OF THE INVENTION

In a case in which the internal combustion engine is stopped by intermittent operation control of a hybrid vehicle, or fuel cut-off operation is performed while the vehicle travels downhill, fuel might undesirably leak from the fuel injection valves if the fuel pressure in the high-pressure fuel system is kept high. To prevent this, the fuel pressure of the high-pressure fuel system is reduced by a leakage mechanism such as a pressure reducing valve. In such a leakage mechanism, when diagnosing the presence/absence of an abnormality in the leakage mechanism itself, the fuel pressure variation caused when the leakage mechanism leaks fuel is detected as described in Patent Document 1.

However, during such a diagnosis, heat is not generated in the internal combustion engine since combustion is not being performed by the internal combustion engine, and the fuel temperature in the high-pressure fuel system is decreased from a high-temperature state. Thus, the fuel pressure in the high-pressure fuel system is reduced in accordance with the temperature decrease.

Thus, even though the leakage mechanism is not leaking fuel, the fuel pressure in the high-pressure fuel system is reduced, and it appears as though there has been fuel leakage.

In such a circumstance, although the diagnosis apparatus diagnoses the leakage mechanism as being abnormal due to the fuel pressure in the high-pressure fuel system not being decreased immediately before the temperature is decreased in the high-pressure fuel system, an erroneous diagnosis might be made that the leakage mechanism has returned to a state in which fuel can be leaked normally if the fuel pressure is decreased in accordance with the temperature decrease of the high-pressure fuel system. This causes a deterioration in diagnosis accuracy.

In Patent Document 1 for diagnosing the presence/absence of an abnormality in the fuel pressure sensor, the time intervals for detecting the pressure is increased as the temperature is decreased in consideration of the fuel viscosity. However, if such a method is applied to diagnosis of a leakage mechanism, the diagnosis is delayed by a longer period of time as the temperature of the high-pressure fuel system is decreased. In such a case, the fuel pressure in the high-pressure fuel system is further reduced due to temperature decrease even though the leakage mechanism is not executing fuel leakage. This further deteriorates diagnosis accuracy.

Accordingly, it is an objective of the present invention to increase the diagnosis accuracy for diagnosing the presence/absence of an abnormality in the leakage mechanism, which leaks fuel from the high-pressure fuel path of an internal combustion engine.

To achieve the above objective, a first aspect of the present invention provides a leakage mechanism diagnosis apparatus for use in an internal combustion engine including a high-pressure fuel path extending from a high-pressure fuel pump to a fuel injection valve, and a leakage mechanism for reducing fuel pressure in the high-pressure fuel path by leaking fuel from the high-pressure fuel path. The apparatus includes a fuel pressure detecting section and a diagnosing section. The fuel pressure detecting section is arranged in the high-pressure fuel path and detects the fuel pressure in the high-pressure fuel path. The diagnosing section diagnoses the presence/absence of an abnormality during fuel leakage performed by the leakage mechanism based on the fuel pressure detected by the fuel pressure detecting section. The diagnosing section does not perform the diagnosis when the duration of a stopped state of the internal combustion engine exceeds a predetermined time period.

When the internal combustion engine is stopped, the fuel injection valves do not spray fuel, and heat due to combustion is not generated in the internal combustion engine. Thus, the temperature of the fuel in the high-pressure fuel path is reduced due to radiation of heat.

Since the high-pressure fuel pump does not feed fuel when the internal combustion engine is stopped, the fuel pressure in the high-pressure fuel path is decreased when the leakage mechanism performs the leaking function. However, even though such a fuel leakage performed by the leakage mechanism is not taking place, the fuel pressure in the high-pressure fuel path is decreased due to lower temperature.

Thus, when a certain period of time elapses with the internal combustion engine in the stopped state, even though the leakage mechanism is not leaking fuel, the fuel pressure in the high-pressure fuel path is reduced to a low-pressure level as though fuel has been leaked.

Therefore, during a stopped state of the internal combustion engine, the diagnosis for diagnosing the presence/absence of an abnormality in leakage performed by the leakage mechanism is not performed after a predetermined time period has elapsed, which is set based on the above-described certain period of time.

This increases the diagnosis accuracy in diagnosing the presence/absence of an abnormality in the leakage mechanism, which leaks fuel from the high-pressure fuel path of the internal combustion engine.

In the above described first aspect, the stopped state of the internal combustion engine refers to a state in which at least the high-pressure fuel pump stops feeding fuel, and a plurality of fuel injection valves including the above mentioned fuel injection valve all stop fuel injection. When diagnosing the presence/absence of an abnormality in the leakage performed by the leakage mechanism in such a stopped state of the internal combustion engine, the diagnosis accuracy for diagnosing the presence/absence of an abnormality is increased by setting the predetermined time period as described above.

The leakage mechanism diagnosis apparatus may further include a temperature detecting section, which detects at least one of coolant temperature of the internal combustion engine and external temperature. In this case, the diagnosing section adjusts the length of the predetermined time period in accordance with at least one of the coolant temperature and the external temperature detected by the temperature detecting section.

The predetermined time period may be set uniformly, but the length of the predetermined time period may be adjusted in accordance with at least one of the coolant temperature and the external temperature as described above.

The coolant temperature and the external temperature affect the decrease rate of the fuel temperature in the high-pressure fuel path while the internal combustion engine is stopped. This affects the decrease rate of the fuel pressure in the high-pressure fuel path. Thus, it is preferable to adjust the length of the predetermined time period in accordance with at least one of the coolant temperature and the external temperature.

This further increases the diagnosis accuracy for diagnosing the presence/absence of an abnormality in the leakage mechanism, which leaks fuel from the high-pressure fuel path of the internal combustion engine.

The diagnosing section shortens the predetermined time period as one of the coolant temperature and the external temperature detected by the temperature detecting section is decreased.

More specifically, the lower the coolant temperature or the external temperature is, the faster the temperature of fuel in the high-pressure fuel path is decreased while the internal combustion engine is stopped. This also rapidly decreases the fuel pressure.

Thus, even though the leakage mechanism is not leaking fuel, the lower the coolant temperature or the external temperature is, the earlier the fuel pressure in the high-pressure fuel path is reduced to the low-pressure level as though there has been a leakage.

Therefore, the predetermined time period is shortened as at least one of the coolant temperature and the external temperature is reduced. This increases the diagnosis accuracy for diagnosing the presence/absence of an abnormality in the leakage mechanism, which leaks fuel from the high-pressure fuel path in the internal combustion engine.

A second aspect of the present invention provides a leakage mechanism diagnosis apparatus for use in an internal combustion engine including a high-pressure fuel path extending from a high-pressure fuel pump to a fuel injection valve, and a leakage mechanism for reducing fuel pressure in the high-pressure fuel path by leaking fuel from the high-pressure fuel path. The apparatus includes a fuel pressure detecting section, a diagnosing section, and a temperature detecting section. The fuel pressure detecting section is arranged in the high-pressure fuel path and detects the fuel pressure in the high-pressure fuel path. The diagnosing section diagnoses the presence/absence of an abnormality in fuel leakage performed by the leakage mechanism based on the fuel pressure detected by the fuel pressure detecting section. The temperature detecting section detects at least one of the coolant temperature of the internal combustion engine and the external temperature. If at least one of the coolant temperature and the external temperature is lower than a predetermined temperature, the diagnosing section does not perform the diagnosis during a stopped state of the internal combustion engine.

As described above, even though the leakage mechanism is not leaking fuel, the fuel pressure in the high-pressure fuel path decreases in accordance with decreasing temperature. If a certain period of time elapses in this state, the fuel pressure in the high-pressure fuel path is reduced as though fuel has been leaked, even though the leakage mechanism is not leaking fuel.

However, in a case in which at least one of the coolant temperature and the external temperature is lower than the predetermined temperature from the beginning of the stopped state of the internal combustion engine, the temperature of the fuel in the high-pressure fuel path rapidly decreases.

Thus, the fuel pressure in the high-pressure fuel path is rapidly decreased from the beginning of the stopped state of the internal combustion engine, and the fuel pressure is reduced to a low-pressure level as though fuel has been leaked even though the leakage mechanism is not leaking fuel.

Therefore, in a case in which at least one of the coolant temperature and the external temperature is lower than the predetermined temperature, the diagnosis is not performed for the duration of a stopped sate of the internal combustion engine to prevent an erroneous diagnosis.

This increases the diagnosis accuracy in diagnosing the presence/absence of an abnormality in the leakage mechanism for leaking fuel from the high-pressure fuel path of the internal combustion engine.

In the above-described second aspect, the stopped state of the internal combustion engine refers to a state in which at least the high-pressure fuel pump stops feeding fuel, and fuel injection valves including the fuel infection valve stop fuel injection. In such a state, the diagnosis accuracy for diagnosing the presence/absence of an abnormality is increased by not performing the diagnosis for diagnosing the presence/absence of an abnormality during leakage of the leakage mechanism in a case in which at least one of the coolant temperature and the external temperature is lower than the predetermined temperature.

A third aspect of the present invention provides a leakage mechanism diagnosis apparatus for use in an internal combustion engine including a high-pressure fuel path extending from a high-pressure fuel pump to a fuel injection valve, and a leakage mechanism for reducing fuel pressure in the high-pressure fuel path by leaking fuel from the high-pressure fuel path. The apparatus includes a fuel pressure detecting section and a diagnosing section. The fuel pressure detecting section is arranged in the high-pressure fuel path and detects the fuel pressure in the high-pressure fuel path. The diagnosing section diagnoses the presence/absence of an abnormality in fuel leakage performed by the leakage mechanism based on the fuel pressure detected by the fuel pressure detecting section. When the fuel pressure detected by the fuel pressure detecting section does not become equal to a low-pressure level corresponding to the fuel leakage performed by the leakage mechanism within a predetermined time period from the start of a duration of a stopped state of the internal combustion engine, the diagnosing section diagnoses the leakage mechanism as being abnormal. Even if the fuel pressure becomes equal to the low-pressure level after a diagnosis is made as being abnormal, the diagnosing section at least does not diagnose the leakage mechanism as being normal if the predetermined time period has elapsed.

During the stopped state of the internal combustion engine, heat is not generated by combustion of the internal combustion engine as described above. Thus, the temperature of the fuel in the high-pressure fuel path is decreased due to radiation of heat. Since the high-pressure fuel pump does not feed fuel during the stopped state of the internal combustion engine, the fuel pressure in the high-pressure fuel path is decreased in accordance with decreasing temperature even though the leakage mechanism is not leaking fuel.

However, since the temperature of the fuel does not immediately decrease at an early stage of the stopped state of the internal combustion engine, it takes time for the fuel pressure to become equal to the low-pressure level. During such time, the diagnosis of an abnormality can be made.

However, when a certain period of time elapses, the fuel pressure in the high-pressure fuel path is reduced to a low level as though fuel has been leaked due to decreasing temperature as described above oven though the leakage mechanism is not leaking fuel.

Therefore, even if the fuel pressure becomes equal to the low-pressure level after the leakage mechanism is temporarily diagnosed as being abnormal, the diagnosis as being normal is not made if the predetermined time period has elapsed, which is set based on the above-described certain period of time. Thus, an erroneous diagnosis is prevented from being made.

This increases the diagnosis accuracy for diagnosing the presence/absence of an abnormality in the leakage mechanism, which leaks fuel from the high-pressure fuel path of the internal combustion engine.

In the above-described third aspect, the stopped slate of the internal combustion engine refers to a state in which at least the high-pressure fuel pump stops feeding fuel, and fuel injection valves including the fuel injection valve stop fuel injection. In such a state, the diagnosis for diagnosing the presence/absence of an abnormality during leakage performed by the leakage mechanism is controlled as described above to prevent an erroneous diagnosis. In this manner, the diagnosis accuracy for diagnosing the presence/absence of an abnormality is increased.

BRIEF DESCRIPTION OF THE DRAWINGS

FIG. 3 is a flowchart showing a process for controlling the execution of leakage mechanism diagnosis according to a second embodiment;

MODE FOR CARRYING OUT THE INVENTION

First Embodiment

Figure 1:
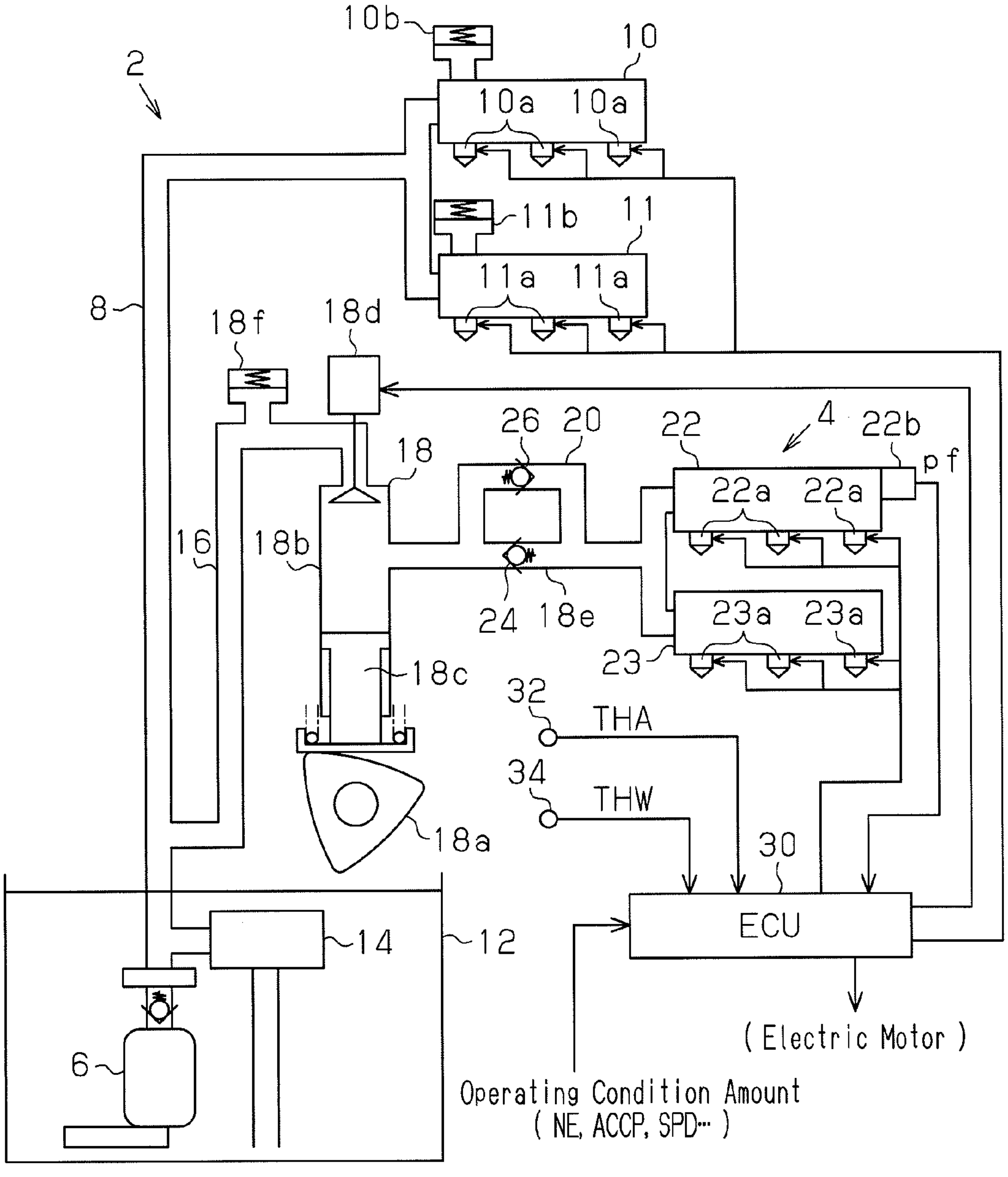
FIG. 1 is a block diagram illustrating a fuel system of an internal combustion engine and a control system of the fuel system according to a first embodiment.

FIG. 1 is a block diagram of a fuel system for an internal combustion engine (an example of a gasoline engine is shown) and a control system of the fuel system according to the present invention. The internal combustion engine is for driving a vehicle. The internal combustion engine, the fuel system, and the control system are mounted on the vehicle. The vehicle is a hybrid vehicle, and includes an electric motor together with the internal combustion engine.

The fuel system includes a low-pressure fuel system 2 and a high-pressure fuel system 4. The low-pressure fuel system 2 includes a feed pump 6, a low-pressure fuel path 8, and low-pressure delivery pipes 10, 11. The fuel pumped up from a fuel tank 12 by the feed pump 6 is supplied to the low-pressure delivery pipes 10, 11 as a low-pressure fuel via the low-pressure fuel path 8. FIG. 1 shows an example of a V6 engine, and two low-pressure delivery pipes 10, 11 are provided. The low-pressure delivery pipe 10 is provided with three low-pressure fuel injection valves 10*a*, and the low-pressure delivery pipe 11 is provided with three low-pressure fuel injection valves 11*a*. That is, a total of six low-pressure fuel injection valves 10*a*, 11*a* are provided. The low-pressure fuel injection valves 10*a* are arranged at intake ports corresponding to the cylinders, and sprays fuel into intake air.

A pressure regulator 14 is arranged in the low-pressure fuel path 8, and the fuel pressure in the low-pressure fuel system 2 is adjusted to a predetermined low-pressure (in the first embodiment, 400 kPa). The low-pressure delivery pipes 10, 11 are provided with pulsation dampers 10*b*, 11*b* for inhibiting the pressure pulsation.

The high-pressure fuel system 4 includes a high-pressure fuel supply path 16, which branches from the low-pressure fuel path 8, a high-pressure fuel pump 18, a leakage passage 20, and high-pressure delivery pipes 22, 23.

The high-pressure fuel pump 18 is driven by the output of the internal combustion engine. In the first embodiment, a pump cam 18*a* is rotated in accordance with rotation of the camshaft of the internal combustion engine, and the rotation reciprocates a plunger 18*c* in a pump cylinder 18*b*. Accordingly, the low-pressure fuel is drawn into the high-pressure fuel pump 28 from the high-pressure fuel supply path 16 via an electromagnetic on-off valve 18*d*, and the compressed fuel is discharged to a discharge passage 18*e* as a high-pressure fuel. The discharge amount is adjusted by an opening/closing duty ratio of the electromagnetic on-off valve 18*d*. A pulsation damper 18*f* for inhibiting pressure pulsation is provided in the high-pressure fuel pump 18 close to the high-pressure fuel supply path 16.

The high-pressure fuel discharged from the discharge passage 18*e* of the high-pressure fuel pump 18 is supplied to the two high-pressure delivery pipes 22, 23. The high-pressure delivery pipe 22 is provided with three high-pressure fuel injection valves 22*a*, and the high-pressure delivery pipe 23 is provided with three high-pressure fuel injection valves 23*a*. That is, a total of six high-pressure fuel injection valves 22*a*, 23*a* are provided. The high-pressure fuel is directly sprayed into the cylinders from the high-pressure fuel injection valves 22*a*, 23*a*. The high-pressure delivery pipe 22 is provided with a fuel pressure sensor 22*b* as shown in the drawing. The fuel pressure sensor 22*b* detects the fuel pressure of in the high-pressure fuel system 4.

A discharge valve 24 is provided in the discharge passage 18*e* of the high-pressure fuel pump 18. The discharge valve 24 is a check valve having a valve opening pressure of, for example, 60 kPa. When the pressure difference between the side corresponding to the high-pressure delivery pipes 22, 23 and the side corresponding to the high-pressure fuel pump 18 is less than or equal to the valve opening pressure, the discharge valve 24 is closed and prevents reverse flow of the high-pressure fuel from the high-pressure delivery pipes 22, 23 to the high-pressure fuel pump 18.

The discharge passage lee is provided with the leakage passage 20, which is arranged in parallel to the discharge valve 24. The leakage passage 20 is provided with a relief valve 26. The valve opening pressure of the relief valve 26 is set to 2 MPa in the first embodiment.

When the high-pressure fuel pump 18 is activated during operation of the internal combustion engine, the relief valve 26 repeats opening and closing in accordance with the motion of the plunger 18*c*.

When the internal combustion engine is stopped, and the high-pressure fuel pump 18 keeps the electromagnetic on-off valve 18*d* opened, the inside of the high-pressure fuel pump 18 is opened to the high-pressure fuel supply path 16 so that the pressure is reduced. Thus, the relief valve 26 is opened to leak the high-pressure fuel in the high-pressure delivery pipes 22, 23. This reduces the fuel pressure in the high-pressure delivery pipes 22, 23 to 2 MPa when the internal combustion engine is stopped.

An electronic control unit (ECU) 30, which plays a central role in the control system, is a control circuit configured mainly by a microcomputer. The ECU 30 performs fuel injection control using the low-pressure fuel injection valves 10*a*, 11*a* and the high-pressure fuel injection valves 22*a*, 23*a*, and a process for controlling the fuel pressure pf. The fuel pressure pf is controlled by adjusting the pumping rate of the fuel discharge from the high-pressure fuel pump 18 to the high-pressure delivery pipes 22, 23 through opening/closing duty control of the electromagnetic on-off valve 18*d*. Furthermore, the ECU 30 performs a process related to the leakage mechanism diagnosis as described below.

Besides the detection of the fuel pressure pf in the high-pressure fuel system 4 by the fuel pressure sensor 22*b*, the ECU 30 detects, for such controls, an external temperature THA by an external temperature sensor 32, and a coolant temperature THW, which is the temperature of the coolant in the internal combustion engine, by a coolant temperature sensor 34. Furthermore, the ECU 30 detects various types of data by other sensors provided in the internal combustion engine. For example, the ECU 30 detects engine speed NE via a crankshaft rotation sensor arranged to face the crankshaft of the internal combustion engine, a depression amount ACCP of a gas pedal via a stroke sensor of the gas pedal, and a vehicle speed SPD via a vehicle speed sensor provided on the axle shaft. As for the external temperature sensor 32, an additional sensor for detecting the external temperature may be provided in an engine compartment or other parts of the vehicle. However, in the first embodiment, the intake temperature sensor, which is arranged in the intake path through which the air taken into the cylinders of the internal combustion engine flows, is used as the external temperature sensor 32.

Furthermore, the ECU 30 performs intermittent operation control. The intermittent operation control is a process for automatically stopping and starting the operation of the internal combustion engine when the vehicle is temporarily stopped, or when the vehicle is travelling.

When the internal combustion engine is stopped by such an intermittent operation control, the ECU 30 performs, based on the behavior of the fuel pressure pf detected by the fuel pressure sensor 22*b*, a leakage mechanism diagnosis process for diagnosing the presence/absence of an abnormality during leakage through the relief valve 26.

More specifically, the state in which at least the high-pressure fuel pump 18 stops feeding fuel and all the fuel injection valves 10*a*, 11*a*, 22*a*, 23*a* stop fuel injection is referred to as a stopped state of the internal combustion engine, that is, an engine stopped state. During such an engine stopped stave, the leakage mechanism diagnosis process is performed as described below.

That is, in the leakage mechanism diagnosis process, if the state in which the fuel pressure pf detected by the fuel pressure sensor 22*b* is reduced to a predetermined low-pressure level is not achieved after a certain period of time has elapsed, the relief valve 26 is diagnosed as being abnormal. Furthermore, if the fuel pressure pf becomes equal to the predetermined low-pressure level, the relief valve 26 is diagnosed as being normal regardless of the elapsed time.

The predetermined low-pressure level refers to a pressure range less than or equal to a pressure value set in the vicinity of the fuel pressure (=2 MPa) that is achieved in a case in which the relief valve 26 performs the leaking function normally. The predetermined low-pressure level corresponds to the pressure range less than or equal to a low-pressure level determination value Px, which will be described below.

Figure 2:
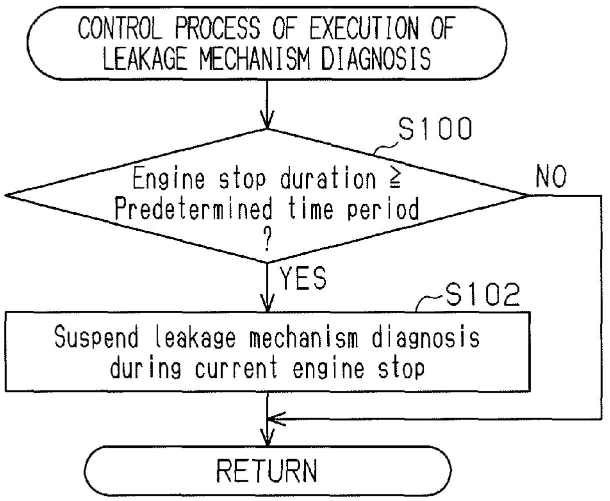
FIG. 2 is a flowchart of a process for controlling the execution of a leakage mechanism diagnosis performed by an ECU according to the first embodiment.

The ECU 30 further performs a process for controlling the execution of leakage mechanism diagnosis as shown in the flowchart of FIG. 2 for such a leakage mechanism diagnosis process. The process for controlling the execution of leakage mechanism diagnosis is a process periodically performed while the engine is stopped. The steps in the flowchart corresponding to each of the processes are represented by "S".

When this process is started, it is determined whether an engine stop duration is longer than or equal to a predetermined time period during a current engine stop (S100). The predetermined time period is previously set as follows.

That is, when the internal combustion engine is stopped, the high-pressure fuel pump 18 does not increase the pressure in the high-pressure fuel system 4. Furthermore, since the internal combustion engine stops generating combustion heat, the temperature of the high-pressure fuel system 4 is reduced. Accordingly, the fuel pressure pf in the high-pressure fuel system 4 is reduced. In this manner, even though the relief valve 26 does not leak fuel from the high-pressure delivery pipes 22, 23, the fuel pressure pf is reduced due to temperature.

Experiments and simulations are performed to obtain the elapsed time from when the engine has stopped until the fuel pressure pf that is reduced duo to the temperature decrease becomes equal to the fuel pressure pf, as though fuel has been leaked. Then, a period of time slightly shorter than the elapsed time is set as the predetermined time period.

If the engine stop duration is not longer than or equal to the predetermined time period that is, if the decision outcome of S100 is negative), the process is temporarily suspended. Hereafter, unless the engine stop duration becomes longer than or equal to the predetermined time period (that is, as long as the decision outcome of S100 is negative), such a state of the process is maintained.

Figure 3:
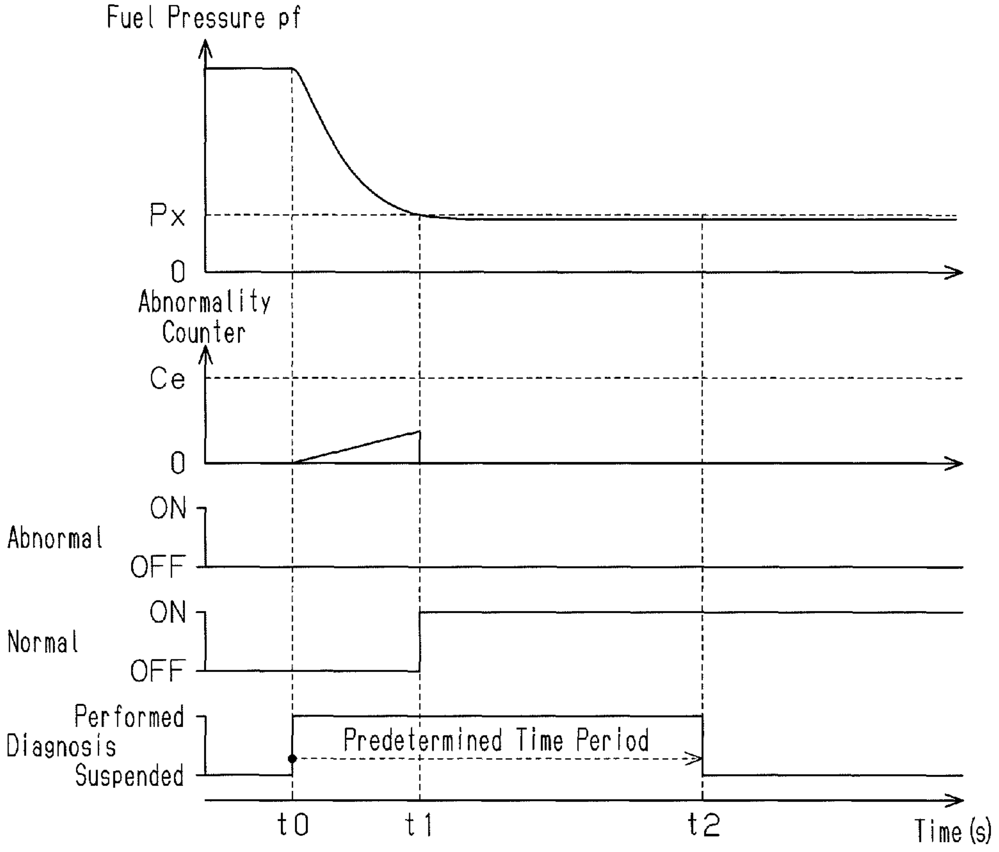
FIG. 3 is a timing chart showing an example of a control process according to the first embodiment.

Therefore, as shown by the timing chart of FIG. 3, the leakage mechanism diagnosis process performed from when the engine is stopped (point in time t0) is not suspended during the predetermined time period (point in time t0 to t2), and the process is continued.

In the example of FIG. 3, in a state in which the fuel pressure pf in the high-pressure fuel system 4 is higher than the low-pressure level determination value Px, the ECU 30 periodically increments an abnormality counter from when the engine is stopped (point in time t0). When the abnormality counter reaches a threshold value Ce, the ECU 30 stores diagnosis data as being abnormal in an internal memory.

However, in the example of FIG. 3, since the relief valve 26 performs its leaking function normally, the fuel pressure pf becomes less than or equal to the low-pressure level determination value Px at the point in time t1 within the predetermined time period. Accordingly, the ECU 30 stores the diagnosis data as being normal in the internal memory, and stops incrementing the abnormality counter.

When the engine stop duration exceeds the predetermined time period (that is, if the decision outcome of S100 is positive: point in time t2), the diagnosis of the relief valve 26 after the point in time t2 (S102) is suspended during the current engine stop.

Thus, the diagnosis, that is, the diagnosis as being normal in this case is maintained during the current engine stop after the point in time t2.

Figure 4:
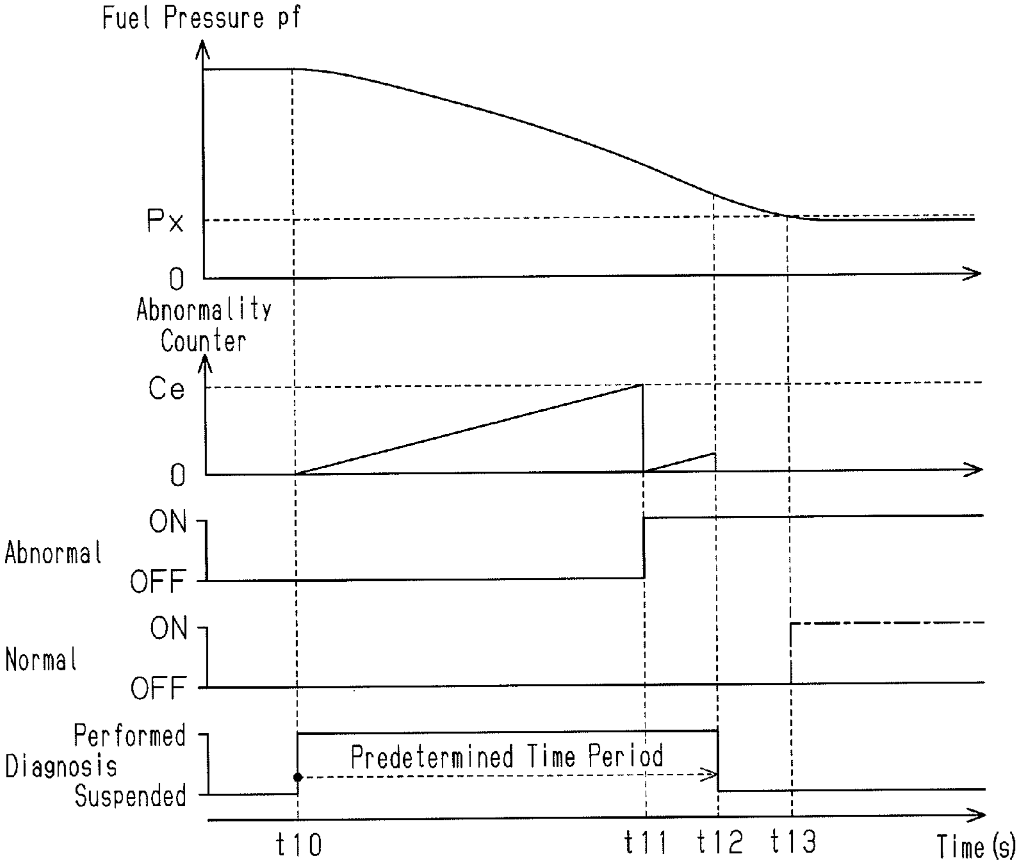
FIG. 4 is a timing chart showing an example of a control process according to the first embodiment.

The timing chart of FIG. 4 shows an example of a case where an abnormality occurs in which the relief valve 26 is hindered from opening even if activation of the high-pressure fuel pump 18 is stopped, and thus the leaking function cannot be performed normally even if the pressure in the high-pressure delivery pipes 22, 23 exceeds 2 MPa.

Since the relief valve 26 cannot leak fuel, the fuel pressure pf is slowly reduced in accordance with the fuel temperature decrease due to heat radiation from the high-pressure fuel system 4 after the engine has stopped (point in time t10).

In the example of FIG. 4, the fuel pressure pf maintains the high-pressure state (pf>Px) during at least the predetermined time period (point in time t10 to t12) from when the engine has stopped (point in time t10). The abnormality counter is incremented during this time period, and the value of the counter reaches the threshold value Ce (point in time t11). Thus, the ECU 30 stores diagnosis data as being abnormal in the internal memory.

Thereafter, if the fuel pressure pf is higher than the low-pressure level determination value Px, incrementing of the abnormality counter is resumed. However, in the example of FIG. 4, the predetermined time period elapses during incrementing of the abnormality counter that has been resumed (that is, the decision outcome of S100 is positive: point in time t12). Thus, the diagnosis is suspended (S102).

Hereafter (after the point in time t12), as long as the current engine stopped state is maintained, diagnosis of the relief valve 26 for diagnosing the presence/absence of an abnormality in its leaking function is suspended. Thus, even if the fuel pressure pf becomes less than or equal to the low-pressure level determination value Px at the point in time t13, which is after the point in time t12, the relief valve 26 is not diagnosed as being normal.

In a case in which the predetermined time period is not set as in the present embodiment, and diagnosis is continuously permitted while the engine is stopped, the relief valve 26 is diagnosed as being normal as shown by a line formed by a long dash alternating with one short dash since the fuel pressure pf becomes less than or equal to the low-pressure level determination value Px at the point in time t13, and the diagnosis is stored in the internal memory of ECU 30 as the latest data. In the present embodiment, such an erroneous diagnosis caused by the fuel temperature decrease does not occur.

In the above described configuration, the fuel pressure sensor 22*b* corresponds to a fuel pressure detecting section, the relief valve 26 corresponds to a leakage mechanism, and the ECU 30 corresponds to a diagnosing section. The above-described leakage mechanism diagnosis process performed by the ECU 30 and the process for controlling the execution of leakage mechanism diagnosis of FIG. 2 correspond to the processes performed by the diagnosing section.

The above-described first embodiment has the following advantages.

(1) When the internal combustion engine is in the stopped state, that is, in a state in which at least the high-pressure fuel pump 18 stops feeding fuel, and all the fuel injection valves 10*a*, 11*a*, 22*a*, 23*a* stop fuel injection, the internal combustion engine does not generate heat due to combustion since the fuel injection valves 10*a*, 11*a*, 22*a*, 23*a* do net spray fuel at all. Thus, the temperature of the fuel in the high-pressure delivery pines 22, 23 is reduced in accordance with heat radiation.

Since the high-pressure fuel pump 18 also does not feed fuel, if the leakage mechanism, which is the relief valve 26 in this embodiment, performs its leaking function, the fuel pressure pf in the high-pressure delivery pipes 22, 23 is rapidly reduced by the fuel leakage as shown in FIG. 3.

However, even though such a fuel leakage performed by the relief valve 26 is not taking place, the fuel pressure pf in the high-pressure delivery pipes 22, 23 is reduced due to temperature decrease as described above.

Thus, as shown in FIG. 4, when a certain period of time elapses in a state in which the internal combustion engine is stopped, even though the relief valve 26 is not leaking fuel, the fuel pressure pf in the high-pressure delivery pipes 22, 23 becomes equal to the low-pressure level (less than or equal to the low-pressure level determination value Px) as though fuel has been leaked.

Thus, during the time period in which the stopped state of the engine is maintained, diagnosis of the relief valve 26 for diagnosing the presence/absence of an abnormality is not performed (S102) after the predetermined time period has elapsed (the decision outcome of S100 is positive). The predetermined time period is set based on she above-mentioned certain period of time. This prevents the relief valve 26 from being erroneously diagnosed as being normal (diagnosis shown by a dashed line by a long dash alternating with one short dash) although the relief valve 26 has an abnormality as shown in FIG. 4.

This increases the diagnosis accuracy for diagnosing the presence/absence of an abnormality in the relief valve 26, which leaks fuel from the high-pressure fuel path of the internal combustion engine (the high-pressure delivery pipes 22, 23 in the first embodiment).

Second Embodiment

In the second embodiment, the predetermined time period is changed in accordance with the external temperature THA and the coolant temperature THW. Thus, the ECU 30 periodically performs a process for controlling the execution of leakage mechanism diagnosis shown in FIG. 5 instead of the process of FIG. 2. Since other structure is the same as the first embodiment, the second embodiment will also be described with reference to FIG. 1.

When the engine is stopped so that the process for controlling the execution of leakage mechanism diagnosis (FIG. 5) is started, first, the external temperature THA detected by the external temperature sensor 32 and the coolant temperature THW detected by the coolant temperature sensor 34 are input to a working memory in the ECU 30 (S200).

Then, the predetermined time period is set based on the external temperature THA and the coolant temperature THW using a predetermined time period setting map MAPaw (S202). The predetermined time period setting map MAPaw is configured as a map having the relationship shown in, for example, FIG. 6.

Figure 6:
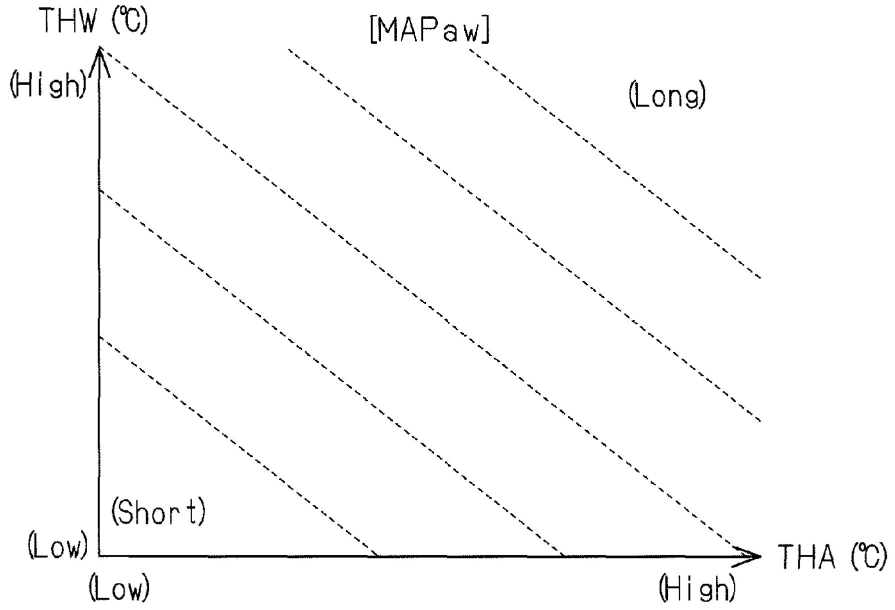
FIG. 6 is a diagram for explaining a predetermined time period setting map MAPaw used in the second embodiment.

The relationship of the value of the external temperature THA and the coolant temperature THW with respect to the length of the predetermined time period is set such that when the external temperature THA or the coolant temperature THW is low, the predetermined time period is decreased, and when the external temperature THA or the coolant temperature THW is high, the predetermined time period is increased as shown by the contours of broken lines in FIG. 6. If the external temperature THA and the coolant temperature THW are both low, the predetermined time period is particularly decreased, and if the external temperature THA and the coolant temperature THW are both high, the predetermined time period is particularly increased. For example, the predetermined time period is set to 10 seconds at the shortest, and 30 seconds at the longest, the predetermined time period for the region between them is set corresponding to value distribution shown by the contour line of FIG. 6.

As described in the first embodiment, the predetermined time period is set based on the period of time required for the fuel pressure pf, which is reduced by temperature decrease of the high-pressure fuel system 4 associated with stopping of the engine, to become equal to the fuel pressure pf as though fuel has been leaked even though the relief valve 26 has not leaked fuel.

However, if the external temperature THA or the coolant temperature THW is low, the fuel temperature decrease is promoted, and the fuel pressure pf is decreased, in a short period of time, to the fuel pressure pf as though fuel has been leaked even though the relief valve 26 does not leak fuel. In contrast, if the external temperature THA or the coolant temperature THW is high, the fuel temperature decrease is delayed, and the fuel pressure pf does not decrease to the fuel pressure pf as though fuel has been leaked unless a long period of time elapses.

In consideration of such a relationship, the predetermined time period setting map MAPaw of FIG. 6 is set as described above. Therefore, the predetermined time period that promptly and highly accurately achieves a diagnosis suspension timing is set using the predetermined time period setting map MAPaw.

Figure 5:
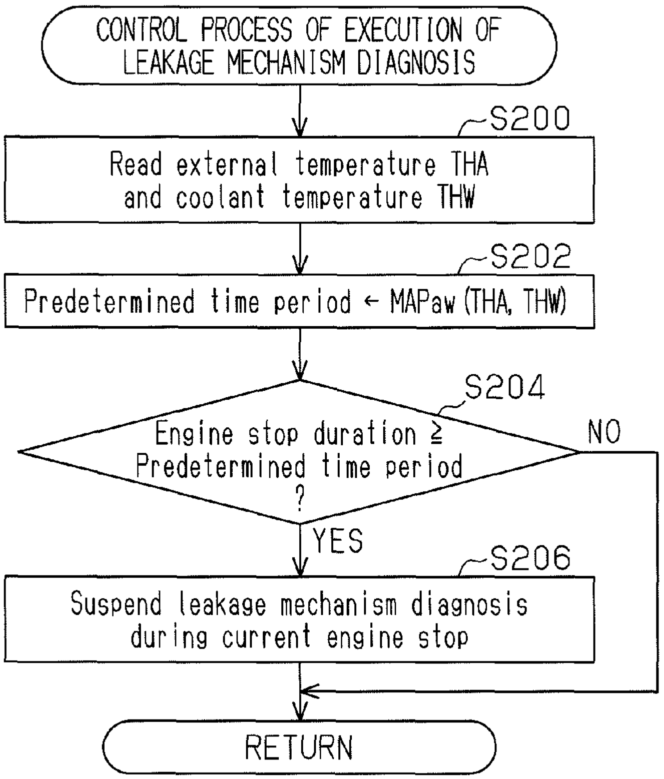

In FIG. 5, it is determined whether the engine stop duration is continued for the predetermined time period or longer (S204) using the predetermined time period set as described above in the same manner as described in FIG. 2 of the first embodiment. If the engine stop duration is not longer than or equal to the predetermined time period (that is, if the decision outcome of S204 is negative), the process is suspended. Thus, the above-described leakage mechanism diagnosis process is continued.

If the engine stop duration is longer than or equal to the predetermined time period (that is, if the decision outcome of S204 is positive), the diagnosis of the relief valve 26 for diagnosing the presence/absence of an abnormality during the current engine stop is suspended (S206).

Figure 7:
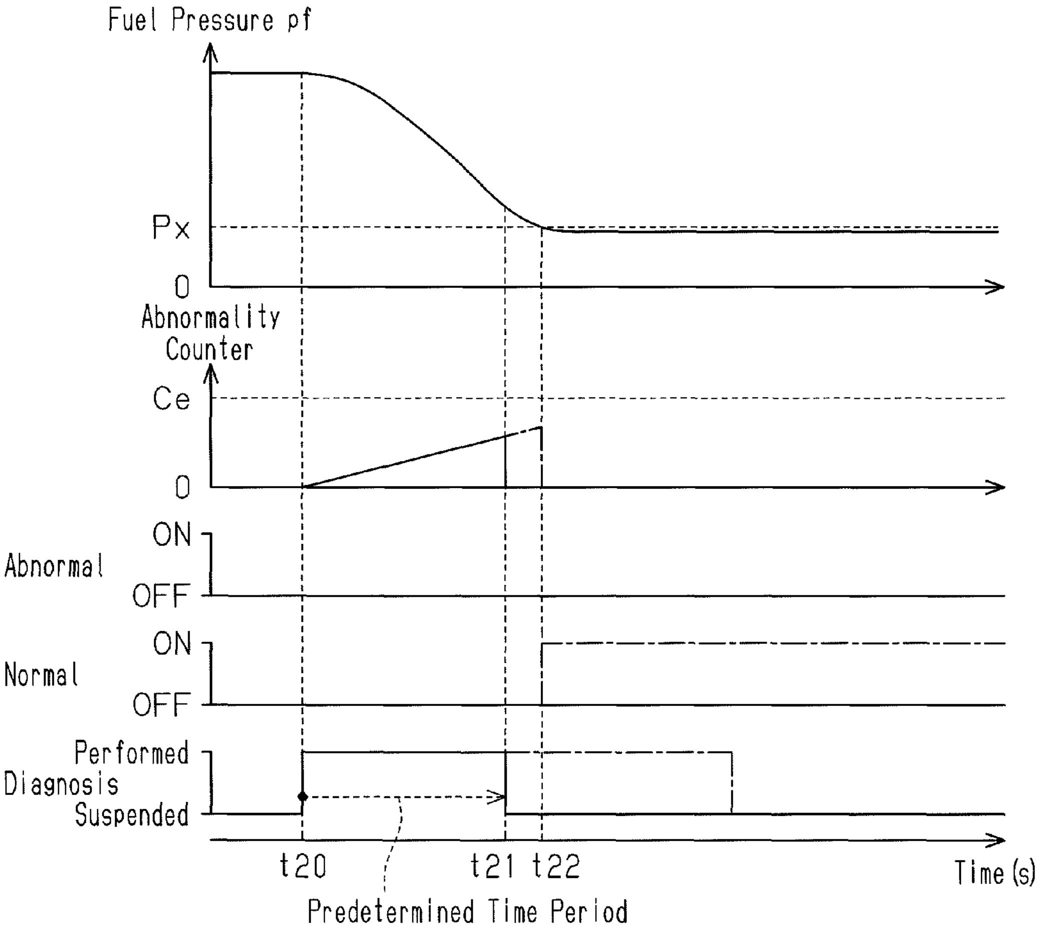
FIG. 7 is a timing chart showing an example of a control process according to the second embodiment.

The timing chart of FIG. 7 shows an example of an abnormal leakage performed by the relief valve 26. In this example, the predetermined time period set in accordance with the predetermined time period setting map MAPaw is shorter than that in the example shown in FIG. 4 since the external temperature THA and the coolant temperature THW are low.

That is, the fuel pressure pf is reduced in accordance with the fuel temperature decrease due to heat radiation of the high-pressure fuel system 4 after the point in time at which the engine is stopped (t20). However, since the external temperature THA and the coolant temperature THW are significantly low, the fuel pressure pf rapidly decreases as compared to the case of FIG. 4 although the relief valve 26 has an abnormal leakage.

At the early stage of the engine stop, the abnormality counter is incremented since the fuel pressure pf is higher than the low-pressure level determination value Px. However, since the predetermined time period (t20 to t21) set in accordance with the predetermined time period setting map MAPaw is short, the predetermined time period ends (t21) before the abnormality counter reaches the threshold value Ce.

Thus, the decision outcome of step S204 is positive after the point in time t21, and the leakage mechanism diagnosis of the relief valve 26 is suspended (S206). Thus, the abnormality counter is stopped, and diagnosis for diagnosing the presence/absence of an abnormality is not performed thereafter.

If the predetermined time period is not adjusted in accordance with the external temperature THA and the coolant temperature THW, the fuel pressure pf might become less than or equal to the low-pressure level determination value Px before or after the abnormality counter reaches the threshold value Ce (before reaching the threshold value Ce in FIG. 7) within the predetermined time period as shown by a line formed by a long dash alternating with one short dash in FIG. 7. In this case, the diagnosis data as being normal is stored in the internal memory of the ECU 30 as the latest diagnosis data. In the second embodiment, an erroneous diagnosis associated with such a fuel temperature decrease is not made.

In the above-described configuration, the fuel pressure sensor 22*b* corresponds to the fuel pressure detecting section, the external temperature sensor 32 and the coolant temperature sensor 34 correspond to the temperature detecting section, the relief valve 26 corresponds to the leakage mechanism, and the ECU 30 corresponds to the diagnosing section. The leakage mechanism diagnosis process performed by the ECU 30 and the process for controlling the execution of leakage mechanism diagnosis of FIG. 5 correspond to the processes performed by the diagnosing section.

The second embodiment has the following advantage.

(1) As well as the advantages of the first embodiment, the predetermined time period is not uniformly set, but the length of the predetermined time period is adjusted in accordance with the coolant temperature THW and the external temperature THA as described above. Accordingly, the diagnosis accuracy for diagnosing the presence/absence of an abnormality in the relief valve 26 is further increased as described with reference to FIG. 7.

Third Embodiment

Figure 8:
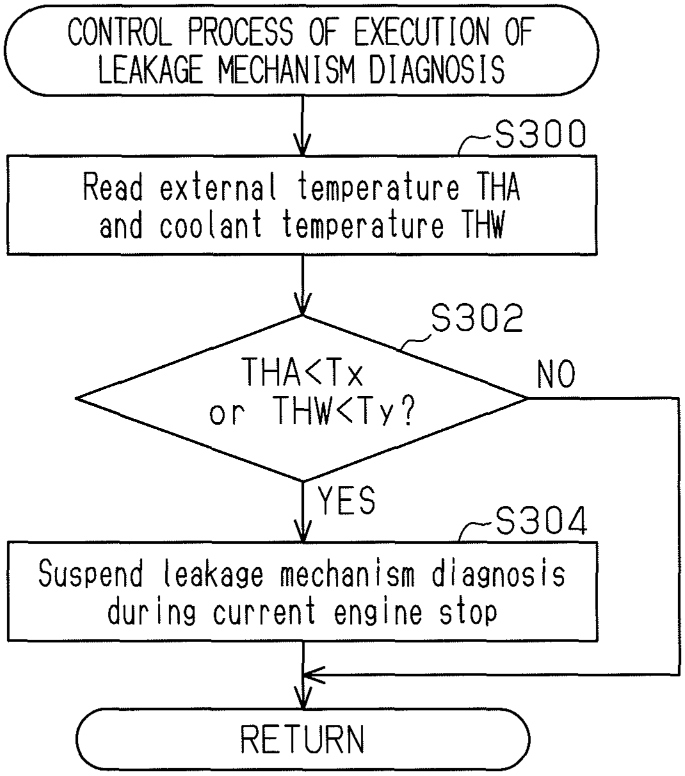
FIG. 8 is a flowchart showing a process for controlling the execution of leakage mechanism diagnosis according to a third embodiment.

In the third embodiment, the ECU 30 periodically performs a process for controlling the execution of leakage mechanism diagnosis as shown in FIG. 8 instead of the process of FIG. 2. Since other structure is the same as the first embodiment, the third embodiment will also be described with reference to FIG. 1.

When the engine is stopped so that the process for controlling the execution of leakage mechanism diagnosis (FIG. 8) is started, first, the external temperature THA detected by the external temperature sensor 32 and the coolant temperature THW detected by the coolant temperature sensor 34 are input to the working memory in the ECU 30 (S300).

Then, it is determined whether either one of the state in which the external temperature THA is lower than a predetermined temperature Tx, and the state in which the coolant temperature THW is lower than a predetermined temperature Ty is satisfied (S302). The predetermined temperature Tx is the boundary showing whether the external temperature THA is in a low-temperature state. The predetermined temperature Ty is the boundary showing whether the coolant temperature THW is in a low-temperature state.

If the external temperature THA is not less than the predetermined temperature Tx, and the coolant temperature THW is not less than the predetermined temperature Ty (that is, if the decision outcome of S302 is negative, the ECU temporarily suspends the process. Therefore, the leakage mechanism diagnosis of the relief valve 26 can be executed.

However, if the external temperature THA is less than the predetermined temperature Tx or the coolant temperature THW is less than the predetermined temperature Ty, that is, if at least one of the condition in which the external temperature THA is less than the predetermined temperature Tx, and the condition in which the coolant temperature THW is less than the predetermined temperature Ty is satisfied (if the decision outcome of S302 is positive), the diagnosis of the relief valve 26 for determining the presence/absence of an abnormality is suspended (S304) during the current engine stop.

Figure 9:
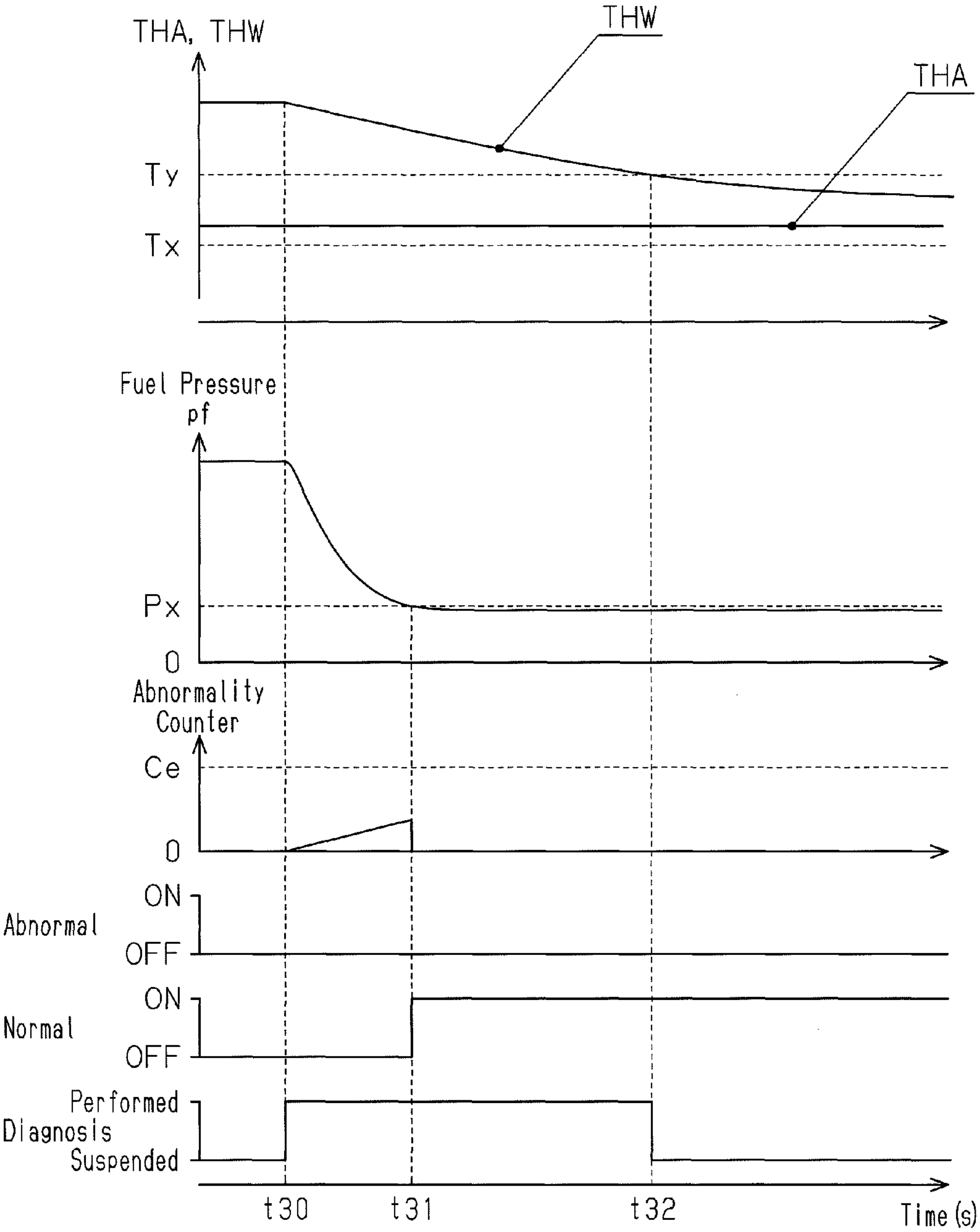
FIG. 9 is a timing chart showing an example of a control process according to a third embodiment.

The case in which the relief valve 26 is performing the leaking function normally is shown in the timing chart of FIG. 9. If the external temperature THA is greater than or equal to the predetermined temperature Tx and the coolant temperature THW is greater than or equal to the predetermined temperature Ty when the engine is stopped (t30) (that is, if the decision outcome of S302 is negative), the leakage mechanism diagnosis can be performed.

Thus, the ECU 30 periodically increments the abnormality counter in a state in which the fuel pressure pf of the high-pressure fuel system 4 is higher than the low-pressure level determination value Px (t30 to t31). However, the fuel pressure pf becomes less than or equal to the low-pressure level determination value Px by the fuel leakage of the relief valve 26 (t31) before the abnormality counter reaches the threshold value Ce. Thus, the ECU 30 stops incrementing the abnormality counter, and stores the diagnosis data as being normal in the internal memory.

Thereafter, when the coolant temperature THW becomes less than the predetermined temperature Ty (that is, if the decision outcome of S302 is positive: t32), the diagnosis of the relief valve 26 for diagnosing the presence/absence of an abnormality will hereafter be suspended (S304) during the current engine stop.

Therefore, the diagnosis, that is, the diagnosis as being normal in this case is maintained during the current engine stop.

Figure 10:
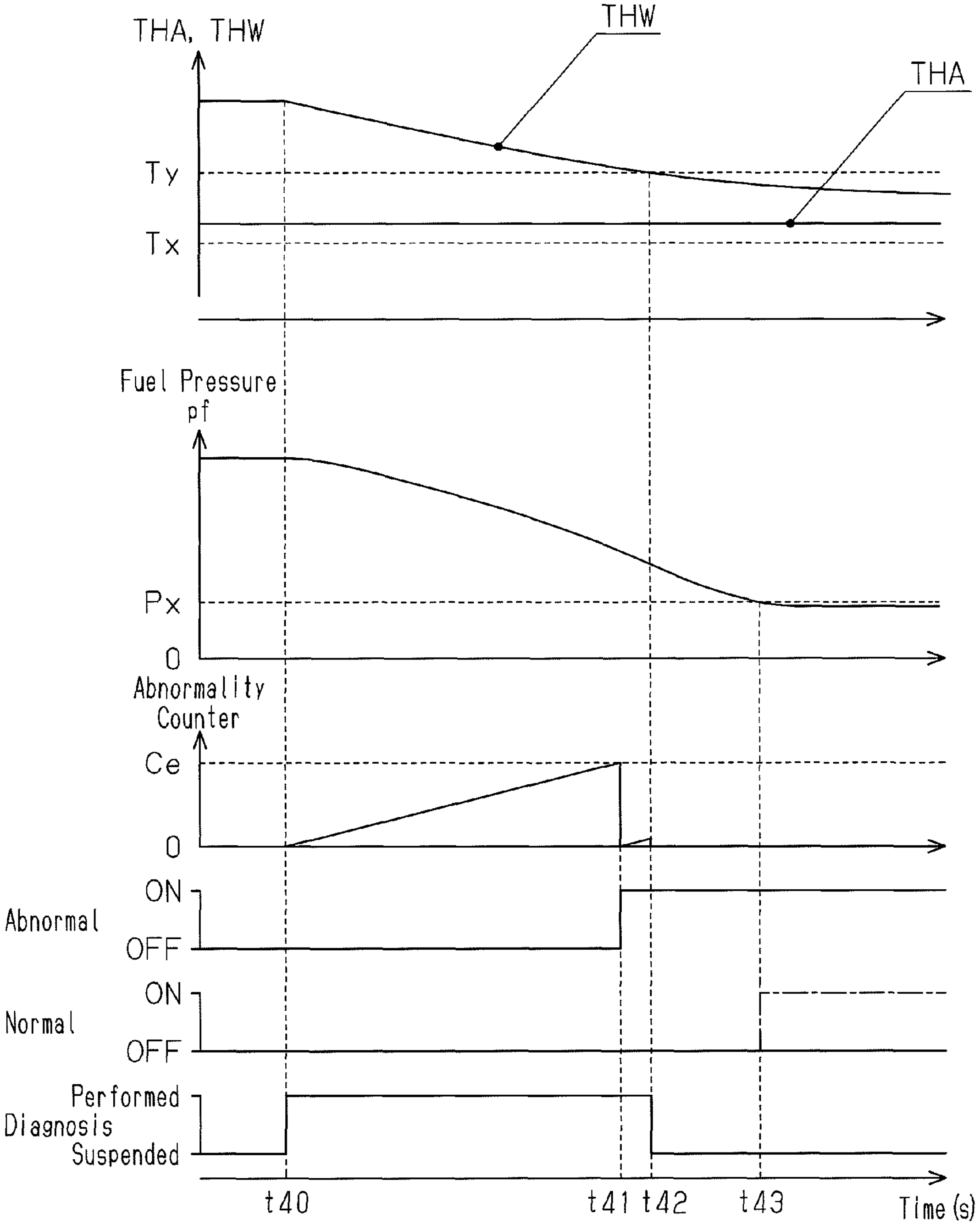
FIG. 10 is a timing chart showing an example of a control process according to the third embodiment.

The case in which the relief valve 26 cannot perform its leaking function due to an abnormality is shown in the timing chart of FIG. 10. If the external temperature THA is greater than or equal to the predetermined temperature Tx and the coolant temperature THW is greater than or equal to the predetermined temperature Ty when the engine is stopped (t40), (that is, if the decision outcome of S302 is negative), the leakage mechanism diagnosis can be performed.

Since the ECU 30 periodically increments the abnormality counter in a state in which the fuel pressure pf of the high-pressure fuel is higher than the low-pressure level determination value Px, the abnormality counter reaches the threshold value Ce (t40 to t41). Thus, the ECU 30 stores the diagnosis data as being abnormal in the internal memory.

Thereafter, the coolant temperature THW becomes lower than the predetermined temperature Ty (that is, the decision outcome of S302 is positive: t42). Thus, the diagnosis of the relief valve 26 for diagnosing the presence/absence of an abnormality is suspended (S304) during the current engine stop.

Furthermore, the fuel pressure pf subsequently becomes less than or equal to the low-pressure level determination value Px due to the fuel temperature decrease (t43) in the state in which the relief valve 26 is not leaking fuel. However, at the point in time t43, since the diagnosis for diagnosing the presence/absence of an abnormality has already been suspended, an erroneous diagnosis as being normal is not made. Thus, the diagnosis as being abnormal is maintained during the current engine stop.

It the diagnosis for diagnosing the presence/absence of an abnormality is continued even if the coolant temperature THW is reduced, an erroneous diagnosis as being normal is made at the point in time t43 as shown by a line a line formed by a long dash alternating with one short dash in FIG. 10.

Figure 11:
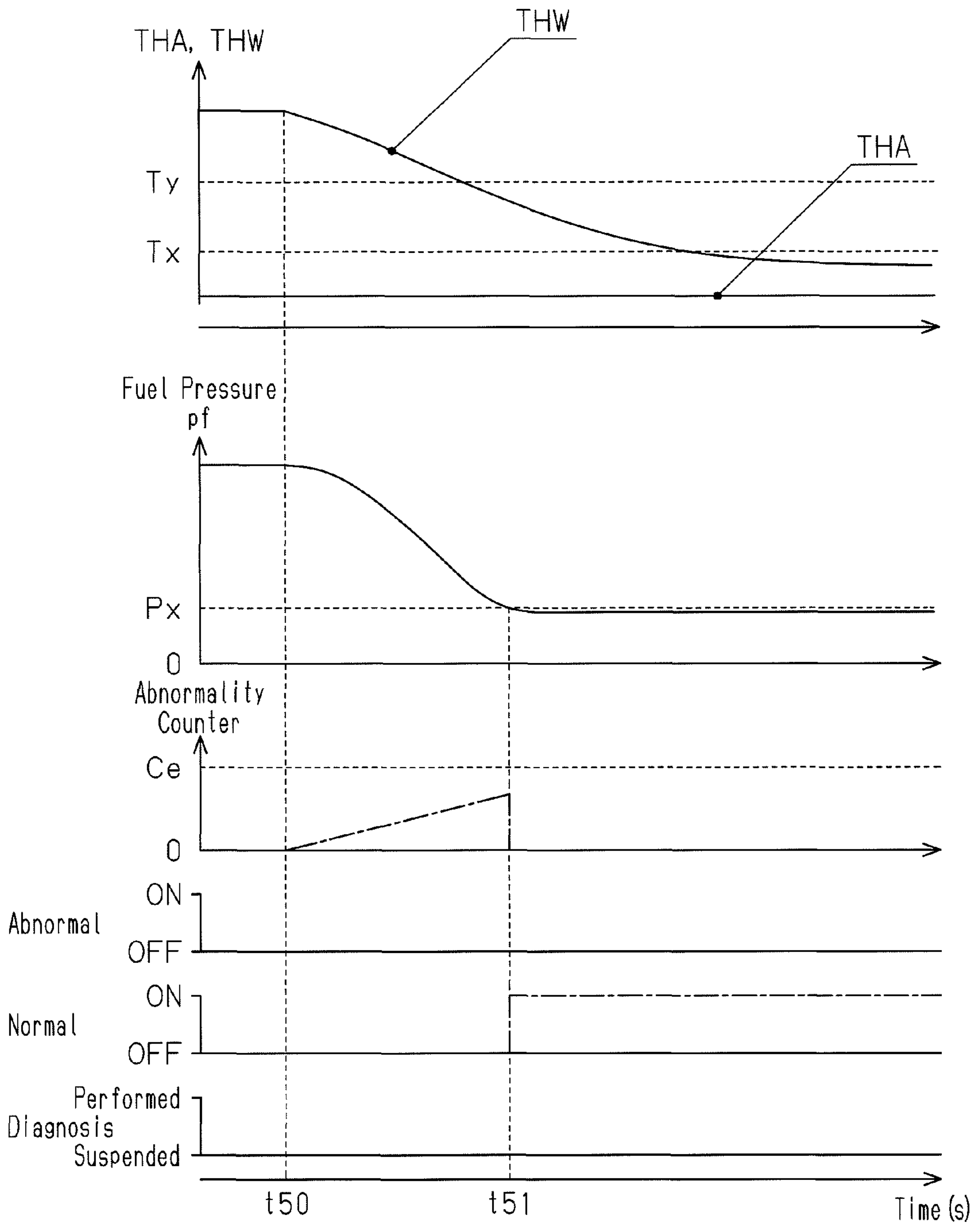
FIG. 11 is a timing chart showing an example of a control process according to the third embodiment.

FIG. 11 shows a case in which the external temperature THA is less than the predetermined temperature Tx from the beginning of when the engine is stopped in a state in which the relief valve 26 cannot perform its leaking function due to an abnormality. In this case, the diagnosis of the relief valve 26 for diagnosing the presence/absence of an abnormality is suspended from the beginning of when the engine is stopped (t50).

Therefore, even if the fuel pressure pf rapidly becomes less than or equal to the low-pressure level determination value Px (t51) due to rapid temperature decrease of the fuel in the high-pressure fuel system 4, the diagnosis for diagnosing the presence/absence of an abnormality is already in a suspended state. This prevents an erroneous diagnosis of normal leakage that is made when the diagnosis is continued as shown by the dashed line formed by a long dash alternating with one short dash.

In the above-described configuration, the fuel pressure sensor 22*b* corresponds to the fuel pressure detecting section, the external temperature sensor 32 and the coolant temperature sensor 34 correspond to the temperature detecting section, the relief valve 26 corresponds to the leakage mechanism, and the ECU 30 corresponds to the diagnosing section. The leakage mechanism diagnosis process performed by the ECU 30 and the process for controlling the execution of leakage mechanism diagnosis of FIG. 8 correspond to the processes performed by the diagnosing section.

The above described third embodiment has the following advantage.

(1) In a case in which either the external temperature THA or the coolant temperature THW is lower than the predetermined temperature Tx or Ty as described above, the diagnosis is suspended from the beginning. Thus, an erroneous diagnosis of the relief valve 26 is prevented, and the diagnosis accuracy for diagnosing the presence/absence of an abnormality is increased as described in FIGS. 9 to 11.

Other Embodiments

In each of the above-described embodiments, the diagnosis of the relief valve for diagnosing the presence/absence of an abnormality during the intermittent operation control of the hybrid vehicle is described. However, the above-described process for controlling the execution of leakage mechanism diagnosis can be performed in the same manner in another stopped state of the engine as long as the high-pressure fuel pump stops feeding fuel, and fuel injection of all the fuel injection valves is stopped.

The above-mentioned other stopped state of the engine includes, for example, a case in which the vehicle driver stops the internal combustion engine, or a case in which fuel cut-off operation is performed while traveling downhill. In such cases, the same advantages as the above embodiments are provided by applying the process according to the above-described embodiments.

Thus, the present invention may be applied not only to the hybrid vehicle, but also to any vehicles as long as the above-described internal combustion engine is mounted thereon. Therefore, the intermittent operation control performed by the ECU in the above embodiments may include not only the intermittent operation control performed in the hybrid vehicle, but also the intermittent operation control in a general sense Including "ECU-run control" such as idling reduction, and fuel cut-off control.

In the above-described second embodiment, the predetermined time period is set in accordance with both of the coolant temperature THW and the external temperature THA. However, the length of the predetermined time period may be set in accordance with either the coolant temperature THW or the external temperature THA.

In step S302 of the process for controlling the execution of leakage mechanism diagnosis (FIG. 8) shown in the above-described third embodiment, the logical sum of the condition that the external temperature THA is less than the predetermined temperature Tx and the condition that the coolant temperature THW is less than the predetermined temperature Ty is employed. However, only either the condition that the external temperature THA is less than the predetermined temperature Tx or the condition that the coolant temperature THW is less than the Predetermined temperature Ty may be employed. Alternatively, the logical multiplication of the condition that the external temperature THA is less than the predetermined temperature Tx and the condition that the coolant temperature THW is less than the predetermined temperature Ty may be employed.

When the leakage mechanism diagnosis is suspended in each of the above-described embodiments (step S102 of FIG. 2, step S206 of FIG. 5, and step S304 of FIG. 8), the diagnosis for diagnosing the presence/absence of an abnormality is not performed. However, a process that at least does not diagnose as being normal may be employed in step S102 of FIG. 2, step S206 of FIG. 5, or step S304 of FIG. 8 since an erroneous diagnosis is not made if it is not diagnosed as being normal.

DESCRIPTION OF THE REFERENCE NUMERALS

2 . . . Low-Pressure Fuel System, 4 . . . High-Pressure Fuel System, 6 . . . Feed Pump, 8 . . . Low-Pressure Fuel path, 10, 11 . . . Low-Pressure Delivery Pipes, 10*a*, 11*a* . . . Low-Pressure Fuel Injection Valves, 10*b*, 11*b* . . . Pulsation Dampers, 12 . . . Fuel Tank, 14 . . . Pressure Regulator, 16 . . . High-Pressure Fuel Supply Path, 18 . . . High-Pressure Fuel Pump, 18*a* . . . Pump Cam, 18*b* . . . Pump Cylinder, 18*c* . . . Plunger, 18*d* . . . electromagnetic On-Off Valve, 18*e* . . . Discharge passage, 18*f* . . . Pulsation Damper, 20 . . . Leakage passage, 22, 23 . . . High-Pressure Delivery Pipes, 22*a*, 23*a* . . . High-Pressure Fuel Injection Valves, 22*b* . . . Fuel Pressure Sensor, 24 . . . Discharge Valve, 26 . . . Relief Valve, 30 . . . ECU, 32 . . . External Temperature Sensor, 34 . . . Coolant Temperature Sensor.

The invention claimed is:

1. A leakage mechanism diagnosis apparatus for use in an internal combustion engine, the engine including a high-pressure fuel path extending from a high-pressure fuel pump to a fuel injection valve, and a leakage mechanism for reducing fuel pressure in the high-pressure fuel path by leaking fuel from the high-pressure fuel path, the apparatus comprising:

a fuel pressure detecting section arranged in the high-pressure fuel path, the fuel pressure detecting section detecting the fuel pressure in the high-pressure fuel path; and a diagnosing section for diagnosing the presence/absence of an abnormality in fuel leakage performed by the leakage mechanism based on the fuel pressure detected by the fuel pressure detecting section, wherein the diagnosing section does not perform the diagnosis after duration of a stopped state of the internal combustion engine exceeds a predetermined time period.

2. The leakage mechanism diagnosis apparatus according to claim 1, wherein the stopped state of the internal combustion engine refers to a state in which at least the high-pressure fuel pump stops feeding fuel, and a plurality of the fuel injection valves including the fuel injection valve stop fuel injection.

3. The leakage mechanism diagnosis apparatus according to claim 2, further comprising a temperature detecting section for detecting at least one of coolant temperature of the internal combustion engine and external temperature, wherein the diagnosing section adjusts the length of the predetermined time period in accordance with at least one of the coolant temperature and the external temperature detected by the temperature detecting section.

4. The leakage mechanism diagnosis apparatus according to claim 3, wherein the diagnosing section shortens the predetermined time period as one of the coolant temperature and the external temperature detected by the temperature detecting section is decreased.

5. A leakage mechanism diagnosis apparatus for use in an internal combustion engine, the engine including a high-pressure fuel path extending from a high-pressure fuel pump to a fuel injection valve, and a leakage mechanism for reducing fuel pressure in the high-pressure fuel path by leaking fuel from the high-pressure fuel path, the apparatus comprising:

a fuel pressure detecting section arranged in the high-pressure fuel path, the fuel pressure detecting section detecting the fuel pressure in the high-pressure fuel path;

a diagnosing section for diagnosing the presence/absence of an abnormality in fuel leakage performed by the leakage mechanism based on the fuel pressure detected by the fuel pressure detecting section; and a temperature detecting section for detecting at least one of coolant temperature of the internal combustion engine and external temperature, wherein the diagnosing section does not perform the diagnosis for a duration of a stopped state of the internal combustion engine when at least one of the coolant temperature and the external temperature is lower than a predetermined temperature.

6. The leakage mechanism diagnosis apparatus according to claim 5, wherein the stopped state of the internal combustion engine refers to a state in which at least the high-pressure fuel pump stops feeding fuel, and a plurality of injection valves including the fuel injection valve stop fuel injection.

7. A leakage mechanism diagnosis apparatus for use in an internal combustion engine, the engine including a high-pressure fuel path extending from a high-pressure fuel pump to a fuel injection valve, and a leakage mechanism for reducing fuel pressure in the high-pressure fuel path by leaking fuel from the high-pressure fuel path, the apparatus comprising:

a fuel pressure detecting section arranged in the high-pressure fuel path, the fuel pressure detecting section detecting the fuel pressure in the high-pressure fuel path; and a diagnosing section for diagnosing the presence/absence of an abnormality in fuel leakage performed by the leakage mechanism based on the fuel pressure detected by the fuel pressure detecting section, wherein, when the fuel pressure detected by the fuel pressure detecting section does not become equal to a low-pressure level corresponding to the fuel leakage performed by the leakage mechanism within a predetermined time period from the start of a duration of a stopped state of the internal combustion engine, the diagnosing section diagnoses the leakage mechanism as being abnormal, and even if the fuel pressure becomes equal to the low-pressure level after the diagnosis is made as being abnormal, the diagnosing section at least does not diagnose the leakage mechanism as being normal if the predetermined time period has elapsed.

8. The leakage mechanism diagnosis apparatus according to claim 7, wherein the stopped state of the internal combustion engine refers to a state in which at least the high-pressure fuel pump stops feeding fuel, and a plurality of injection valves including the fuel injection valve stop fuel injection.

* * * * *